(No Model.)

M. L. SENDERLING.
VEHICLE SPRING.

No. 578,425. Patented Mar. 9, 1897.

Witnesses
M. E. Fletcher
John N. Tilly

Inventor
Martin L. Senderling
by attorneys
Brown & Seward

UNITED STATES PATENT OFFICE.

MARTIN L. SENDERLING, OF JERSEY CITY, NEW JERSEY.

VEHICLE-SPRING.

SPECIFICATION forming part of Letters Patent No. 578,425, dated March 9, 1897.

Application filed March 25, 1896. Serial No. 584,734. (No model.)

*To all whom it may concern:*

Be it known that I, MARTIN L. SENDERLING, of Jersey City, in the county of Hudson and State of New Jersey, have invented a new and useful Improvement in Vehicle-Springs, of which the following is a specification.

My invention relates to an improvement in vehicle-springs in which the bearing-point of the load is arranged to shift automatically as the load increases in a direction to increase the advantage of the spring with relation to the load which it sustains.

My present invention is more particularly directed to an arrangement whereby the weight is transmitted to the spring by means of one or more single-armed levers, as distinguished from the angle-levers illustrated in my pending application, Serial No. 571,333, in which I have claimed, broadly, the means for supporting a load upon springs in such a manner as to enable the bearing-point of the load to shift as the load increases, so as to give the spring a greater advantage.

Figure 1:
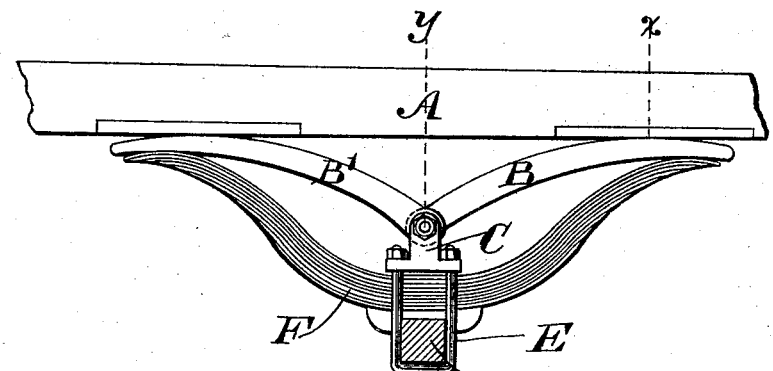
Figure 2:
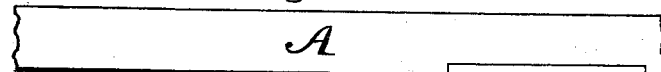

In the accompanying drawings, Figure 1 is a view in side elevation of a half-elliptical spring and the bearing parts in proximity thereto, showing a fragment of a vehicle-body in its relation thereto. Fig. 2 is a similar view of a quarter-elliptic spring, and Fig. 3 is a view of two coiled springs and the bearing parts in proximity thereto.

The body of the vehicle is denoted by A. As shown in Figs. 1 and 3, it rests upon the curved faces of a pair of levers B B', extending in opposite directions from a common support C, to which the levers are pivoted. The support C is fixed on the axle D by means of a clip or clips E, and the same clip or clips may be utilized to secure the half-elliptic spring F to the axle. The free ends of the spring F form supports for the free ends of the levers B B', on which the vehicle-body bears.

In the form shown in Fig. 2 the quarter-elliptic spring F' is shown as secured to the axle in the same manner as the spring F, and the free end of the lever $B^2$, on which the body A rests, is supported on the said spring.

Figure 3:
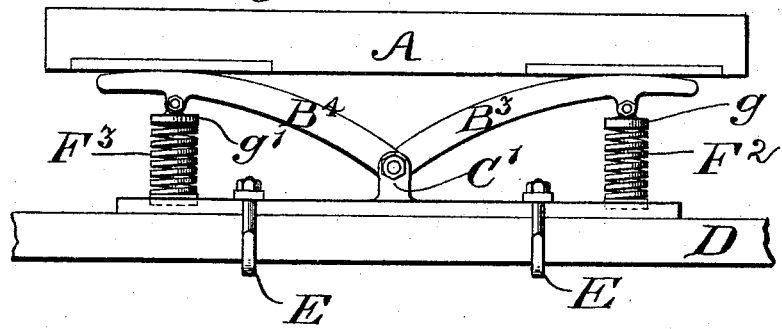

In the form shown in Fig. 3 the body-sustaining levers $B^3$ $B^4$ are pivoted to a common support C', the base of which is extended in opposite directions and forms support for coil-springs $F^2$ $F^3$, on which the free ends of the levers $B^3$ $B^4$ bear. The bearings between the levers and the springs are conveniently formed by hollow-faced caps $g$ $g'$, pivoted at their backs to the under side of the levers and arranged to receive in their bottom faces the tops of the springs.

As the load increases and depresses the springs the bearing point or points of the load on the curved faces of the levers will gradually shift from the starting-point toward the fulcrum of the lever, as, for example, from the dotted line $x$, Fig. 1, toward the dotted line $y$, thereby giving the spring a greater amount of purchase to uphold the lever, so that at no time will the load, whatever its weight, be free from a spring-support, and at no time will the spring be subject to a greater strain than it is intended to sustain.

It is obvious that changes might be resorted to in the form and arrangement of the parts without departing from the spirit and scope of my invention. Hence I do not wish to limit myself strictly to the structure herein shown and described; but

What I claim is—

1. In combination, a support, a lever pivoted at one end to the support, a spring forming a support for the free end of the lever and a vehicle-body sustained by the lever, the connection between the body and the lever being such that the bearing-point, as the load increases, will shift from its starting-point to a point nearer the fulcrum of the lever than the point where the lever bears upon the spring, substantially as set forth.

2. A support, a pair of levers pivoted at one end to the support and extending in opposite directions therefrom, springs interposed between the base of the support and the free ends of the levers and a load-sustaining body having bearings upon the levers, the connection between the body and the levers being such that the bearing-points, as the load increases, will shift from the starting-points to points nearer the fulcrum of the lever than the bearing-points of the levers upon the springs, substantially as set forth.

MARTIN L. SENDERLING.

Witnesses:
FREDK. HAYNES,
IRENE B. DECKER.